United States Patent [19]

Stein et al.

[11] 4,039,343

[45] Aug. 2, 1977

[54] IMPROVED PERFORMANCE DIRECT BONDED BASIC REFRACTORY BRICK AND METHOD OF MANUFACTURE

[75] Inventors: Joseph L. Stein, Allegheny County, Pa.; Walter S. Treffner, Anne Arundel County, Md.

[73] Assignee: General Refractories Company, Bala Cynwyd, Pa.

[21] Appl. No.: 645,261

[22] Filed: Dec. 29, 1975

Related U.S. Application Data

[63] Continuation of Ser. No. 453,394, March 24, 1974, abandoned.

[51] Int. Cl.$^2$ .................. C04B 35/04; C04B 35/12
[52] U.S. Cl. .................................................. 106/59
[58] Field of Search ........................................ 106/59

[56] References Cited

U.S. PATENT DOCUMENTS

| | | | |
|---|---|---|---|
| 3,180,744 | 4/1965 | Davies et al. | 106/59 |
| 3,192,058 | 6/1965 | Davies et al. | 106/59 |
| 3,594,199 | 7/1971 | Treffner et al. | 106/59 |

*Primary Examiner*—J. Poer
*Attorney, Agent, or Firm*—Everett H. Murray, Jr.; Brian G. Brunsvold; Stephen L. Peterson

[57] ABSTRACT

This invention provides improved high fired direct bonded basic magnesite-chrome refractory shapes, such as brick, characterized by the presence of chromium enriched spinel structures distributed in the matrix and bonding the individual periclase crystals. The shapes are thermally stable and resistant to slag penetration and erosion and enjoy improved service life in industrial furnace linings. Also provided is a method of making the improved refractory shapes which comprises forming a mixture of (1) from about 40% to about 75% by weight high purity magnesite, (2) from about 25% to about 60% by weight chrome ore and (3) from about 0.5% to about 10% by weight chromic oxide powder; pressing the mixture into a refractory shape; and firing the refractory shape to a temperature of at least 1700° C.

22 Claims, 8 Drawing Figures

35X  (Mix C)

35X  (Mix A)

130X  (Mix C)

"Cr" = Chromite Crystals 130X  (Mix C)

Cr = Chromite Crystals
P = Periclase (Magnesite)
S = Silicate 130X      (Mix A)

Cr = Chromite Crystals
P = Periclase (Magnesite)
S = Silicate 130X      50% Direct Bonded Brick Cr = Chromite Crystals
P = Periclase (Magnesite)
S = Silicate 35X      (Mix C)

140X      (Mix C)

P = Periclase (Magnesite)
Cr = Chromite Crystals
S = Silicates
Sp = Chrome Enriched Spinel

IMPROVED PERFORMANCE DIRECT BONDED BASIC REFRACTORY BRICK AND METHOD OF MANUFACTURE

This is a continuation of application Ser. No. 453,394 filed 3/24/74, now abandoned.

BACKGROUND OF THE INVENTION

This invention relates to improvements in high fired basic, direct bonded, magnesia-chrome ore, also referred to as magnesite-chrome, refractory shapes and the method of manufacture of such improved shapes. More specifically, refractories made in accordance with this invention are provided which yield significantly improved service life in severe wear zones of industrial furnaces as compared with the performance of a variety of refractory compositions and products commercially available today.

Basic, direct bonded, magnesite-chrome refractory brick represent an important, if not the most important, class of refractory employed as a furnace lining.

The state of the art of conventional direct bonded refractories, presently so relied upon by industry, is well developed in the United States. The introduction of direct bonded refractories early in the 1960's was made possible by the availability of relatively high purity raw materials, especially washed or concentrated chrome ores wherein the $SiO_2$ content was reduced from 4 to 6% down to below 2%, and as low as 1% for ore of African origin known as Transvaal concentrates. Similarly, beneficiated chrome ore with $SiO_2$ content of 1.5 to 3% became available from the Philippines.

These ores in combination with synthetic periclase or dead burned high purity magnesite containing less than 1.5%, preferably less than 1%, $SiO_2$, could be processed into brick shapes in the conventional manner and fired at temperatures higher than 1650° C (3000° F) without excessive slumping or sticking. As is well described in the literature, the direct bond so developed is the result of high temperature interactions between the chromite and magnesia, involving solid state reactions, solution-precipitation reactions and redistribution of silicates which were present in the raw materials as accessory mineral phases. Most desirably, the periclase crystals are sintered directly to chrome ore, periclase is bonded to periclase, and secondary spinels bond periclase crystals. Additionally, some silicate bonding may co-exist.

In the manufacture of direct bonded brick, size graded magnesia and chrome ore are mixed with temporary binders and pressed at pressures exceeding 5000 psi, for example as high as 16,000 psi, dried, and fired at temperatures above 1650° C. Materials, sizing, and processing are adequately described in U.S. Pat. No. 3,180,744.

Refractories important in the 1950's, such as silica brick and chemically bonded basic brick, have largely been replaced by high fired 50, 60 and 70% MgO direct bonded brick in open hearth roofs, walls and uptakes, electric arc furnace walls, and copper converter linings. The newer special processing units such as vacuum degassing and Argon-Oxygen Decarburization (AOD) vessels are currently lined extensively with direct bonded brick. The 60% MgO class is dominant because it represents a desirable economic balance between costs, chemical resistance and physical properties.

Service life or productivity has been generally improved in many of the furnaces employing direct bonded brick thereby leading to new efforts to balance furnace wear by zoning with improved products. Many materials have been tried, such as fused cast basic, rebonded fused grain brick, and direct bonded brick of higher MgO class, but in most cases each was found to have inherent disadvantages.

The more expensive fusion cast basic brick, while similar in chemical composition to conventional direct bonded basic, is extremely dense and essentially free of micropores. Although this product is highly resistant to slag erosion, it often fails due to spalling or cracking and bulk loss initiated by thermal shock stresses. These features detract from its use in modern high production open hearth roof center sections and backwalls as well as AOD tuyere lines and the like.

Rebonded fused grain brick products are even more expensive than the premium priced fused cast shapes for most conventional applications. While somewhat less slag resistant than fusion cast brick, these refractories, where not prone to spalling are often uneconomical at nearly two times the price of conventional direct bonded brick.

Another approach known in the refractories art to produce basic brick with improved service life is to prereact or sinter together the periclase of MgO source, which can be magnesium hydroxide, magnesium carbonate or caustic magnesia, with ground, sized chrome ore at high temperature, e.g., above 1700° C (3100° F), to form direct solid-solid bonding in grains prior to sizing the aggregate for brick forming. In most cases, the shape is fired at temperatures above 1600° C (2910° F). The method of manufacture and properties of basic brick formed from prereacted grains are outlined in Austrian Pat. No. 189,113 and corresponding U.S. Pat. No. 3,429,723.

Unfortunately, it is commercially difficult to produce brick from prereacted grains due to the fact that it is often undesirable to contaminate a periclase grain-producing plant by introducing chrome ore. In a conventional brick plant, the use of a prereacted grain often means an additional, costly processing line to avoid chrome contamination of the periclase grinding and batching system. In any event, while such prereacted brick possess desirable strength and slag resistance, they are less resistant to thermal shock than conventional direct bonded brick and therefore have not proven to be a suitable material for certain severe wear areas, especially where spalling is a factor.

It has even been proposed to improve the strength and further lower the porosity of prereacted magnesite-chrome grain refractory products by adding from 3 to 6% chromic oxide to the refractory batch prior to forming and firing. The method of manufacture and improved properties of such prereacted basic refractory brick is described in U.S. Pat. No. 3,594,199. While the strength is markedly increased and porosity further reduced by this process, brick made therefrom remain less resistant to spalling or thermal shock than conventional direct bonded brick. Moreover, with the prefiring of nearly all the raw materials, and refiring in brick shape form, plus the addition of pure chromic oxide, the selling price required to cover costs and reasonable profit is necessarily high, as high as rebonded fused grain basic brick. Such brick incorporating chromic oxide has previously been suitable for use in only selected limited applications, where furnace shutdowns or severe thermal shock is absent.

It is further known in the art that chromic oxide added to a refractory batch acts as a pressing aid or lubricant to increase the "as pressed" density and density after firing of many classes of refractories, including magnesia, magnesia-chrome, alumina, and zirconia. A portion of the increased density is due to the substitution of chromic oxide material for ingredients of lower specific gravity. The specific gravity of $Cr_2O_3$ is 5.1 to 5.2 while that of periclase is 3.5 to 3.6. In any event, corresponding porosity improvements are cited for such brick in U.S. Pat. No. 3,192,058 which discloses the method of manufacture. However, the use of chromic oxide must be confined to very specific compositional fields in order to realize improved service results commensurate with the increased manufacturing costs incurred with its use. Benefits beyond the effects of higher density and reduced porosity must be achieved in order to make a significant improvement in service life in the lining of an industrial furnace. Therefore, chromic oxide has not been used commercially as extensively as might be inferred from the literature.

A primary object of this invention is to provide an economical, improved high fired direct bonded basic refractory shape combining both increased resistance to slag penetration and resistance to thermal shock, spalling or "slabbing", equal to or better than conventional direct bonded shapes.

An addtional object of this invention is to provide a method of manufacture for an improved high fired direct bonded basic refractory shape.

A further object of this invention is to improve the microstructural features of direct bonded basic refractory shapes which in turn improve slag resistance and physical properties.

Another important object of this invention is to provide an improved high fired direct bonded basic refractory brick which gives improved service life in linings of industrial furnaces, and a method of manufacture for such a brick.

These and other objects will become apparent from the specification and claims.

SUMMARY OF THE INVENTION

This invention is directed to improved, commercially useful, high fired direct bonded basic magnesite-chrome refractory shapes, such as brick and the like, and eliminates many of the disadvantages of prior, conventional direct bonded basic refractory shapes. More particularly, the present invention provides a high fired direct bonded basic magnesite-chrome refractory shape characterized by the presence of chromium enriched spinel structures distributed in the matrix which bond the individual periclase crystals. The refractory shape is made by adding chromic oxide powder to magnesite periclase and chorme ore to form a mixture which is pressed into the desired refractory shape, and fired to a temperature of at least 1700° C.

The mixture comprises (1) from about 40% to about 75% by weight magnesite periclase containing at least about 94% MgO, (2) from about 25% to about 60% by weight chrome ore and (3) from about 0.5% to about 10% by weight chromic oxide powder.

Preferably, the mixture comprises (1) from about 55% to about 65% by weight (magnesite) periclase containing at least about 94% by weight MgO, and especially from about 96% to about 99% by weight MgO, (2) from about 35% to about 45% by weight chrome ore and (3) from about 2% to about 7% chromic oxide powder consisting essentially (90+%) of −325 mesh particles, the mixture having a lime to silica ratio no greater than 1:1, preferably no greater than 0.5:1, and a total silica content of less than about 3%, and especially less than about 2%.

In accordance with one preferred embodiment of the present invention, a high fired direct bonded basic magnesite-chrome refractory brick is made by firing the brick to a temperature of about 1760° C for at least about 4 hours.

According to the method of the present invention, an improved direct bonded basic magnesite-chrome refractory shape is made by adding from about 0.5% to about 10% by weight chromic oxide powder to a conventional high purity magnesite-chrome ore mix to provide a mixture as described above which is pressed into a refractory shape, and high fired to a temperature of at least 1700° C.

Preferably, the shape is fired to a temperature of at least 1700° C for at least about 2 hours. It is presently preferred to fire to a temperature of about 1760° C for at least about 4 hours.

In accordance with one preferred embodiment, this invention provides a method for making an improved direct bonded basic refractory brick from a mixture of (1) from about 55% to about 65% by weight periclase having an MgO content of from about 96% to about 99% by weight, (2) from about 35% to about 45% by weight chrome ore and (3) from about 2% to about 7% chromic oxide powder consisting essentially of −325 mesh particles, the mixture having a lime to silica ratio of no greater than 1:1 and a total silica content of less than about 3%. The mixture is pressed into the shape of a refractory brick, and fired to a temperature of about 1760° C for at least about 4 hours.

The refractory products of this invention fired to a temperature of at least 1700° C exhibit an overall combination of properties which is superior to that of conventional direct bonded basic magnesite-chrome shapes similarly produced from periclase and virgin or unfired chrome ore and free of significant quantities of fused or prereacted magnesite-chrome materials, but without the addition of chromic oxide powder. The high fired products of this invention have superior resistance to slag penetration and erosion, equally good or better resistance to thermal shock and spalling or slabbing, enjoy improved service life in industrial furnace linings, and are economically and functionally suitable for use under the severe conditions of high temperature industrial refractory service.

It is to be understood that the foregoing general description and the following detailed description are only illustrative and exemplary and there will be obvious modifications therein without departing from the spirit or scope of the present invention.

DETAILED DESCRIPTION OF THE INVENTION

This invention is suitable for the production of a variety of high fired direct bonded basic magnesite-chrome refractory shapes, particularly brick. Preferred embodiments of the invention will now be described in detail with reference to the manufacture of high fired direct bonded basic magnesite-chrome refractory brick.

In accordance with the present invention, a high fired direct bonded basic magnesite-chrome refractory brick may be prepared by adding from about 0.5% to about 10% by weight chromic oxide powder to a conventional periclase-chrome ore mix to form a mixture which is then pressed into the shape of a refractory brick, and fired to a temperature of at least 1700° C.

The lime to silica ratio of the conventional brick is usually 1:1 or less than 1:1, preferably less than 0.5:1, so that the native silicates in the refractory brick are predominately forsterite, magnesium silicate, and monticellite. It has been found that the lime to silica ratio of conventional periclase-chrome ore brick is particularly suitable for the brick of the present invention.

Moreover, in order to facilitate firing at 1700° C and above, the combination of periclase and chrome ore should result in an $SiO_2$ content of less than 3%, preferably less than 2%.

In accordance with the present invention, direct bonded basic magnesite-chrome refractory brick can vary widely in the magnesite-chrome ratio. To maintain a desirable balance of economics, adequate strength, and spall resistance, the range commonly practiced is 40 to 75% periclase with 25 to 60% chrome ore by weight. The preferred range optimizing all aspects is 55 to 65% periclase and 35 to 45% chrome ore. Compositions in accordance with this invention contain essentially from 20 to 50% chrome ore. By using high purity periclase of from 96 to 99% purity and small quantities of chromic oxide, a final chemical composition in the 45 to 75% MgO range is achieved.

All materials are size graded for brick-making including particles from −3 mesh, or preferably −6 mesh, to −325 mesh, Tyler.

The periclase can be dead burned magnesite but is nearly always selected from available synthetic magnesite or periclase which is a dead burned dense aggregate of grains of MgO crystals with accessory phases and impurities. Typically, the periclase is used in the composition as coarses 6 × 48 mesh, intermediates 48 × 200 mesh, and fines −325 mesh, Tyler screens.

A suitable periclase useful in this invention may have a chemical composition of from about 94% to about 99% and above by weight MgO, up to 2% by weight $SiO_2$, up to 1% by weight $Fe_2O_3$, up to 1% by weight $Al_2O_3$, up to 1.5% by weight CaO, and up to 0.3% by weight $B_2O_3$. An example of a specific periclase found to be useful according to the present invention has a composition of 97.4% MgO, 0.9% $SiO_2$, 0.3% $Fe_2O_3$, 0.3% $Al_2O_3$, 0.8% CaO, and 0.2% $B_2O_3$.

The chrome ores are obtained from natural deposits. Refractory grade chrome ore is essentially a solid solution of spinel minerals containing oxides of chromium, magnesium, aluminum and iron, accompanied by a siliceous mineral gangue. The chemical composition varies depending on the location of the deposit and the particle size of ore selected from crushing operations. The $SiO_2$ content can vary from 2 to 7%, $Cr_2O_3$ from 30 to over 50%, and the remaining FeO, MgO, and $Al_2O_3$ vary depending upon the nature of the ore and its country of origin. Concentrated ore, consisting of sized and washed particles containing from 1 to 2.5% silica are commonly used in conventional direct bonded brick production. The chrome ore is crushed, if necessary, to provide sizes typically below 8 and 10 mesh, sized graded for the batch.

In accordance with the concept of this invention, the chromic oxide powder is added in an amount of from about 0.5% to about 10% by weight. A particularly preferred range of chromic oxide powder addition is from about 2% to about 7% by weight, and about 4% has been found to be especially suitable.

The chromic oxide powder useful in this invention is a finely divided powder which consists essentially (90+%) of −325 mesh particles. In one finely divided form which is commercially available for use as a pigment, the average particle size of individual particles of chromic oxide powder is no greater than about 10 microns in diameter. This very fine form is suitable for use in this invention. The chromic oxide powder, which usually possesses a rich green color, is water insoluble.

Most available grades of chromic oxide are high purity, i.e., about 97% $Cr_2O_3$, and this degree of purity is desirable for use in this invention.

This invention therefore provides an improved high fired direct bonded basic magnesite-chrome refractory shape, particularly brick, formed from a mixture of:

1. from about 40% to about 75%, preferably from about 55% to about 65%, and especially about 60%, by weight, periclase containing at least about 94%, and preferably from about 96% to about 99%, by weight MgO, 2. from about 25% to about 60%, preferably from about 35% to about 45%, by weight, chrome ore; and 3. from about 0.5% to about 10%, preferably from about 2% to about 7%, and particularly about 4%, by weight, chromic oxide powder consisting essentially of −325 mesh particle size, the chromic oxide powder preferably of high purity, such as at least about 97% by weight $Cr_2O_3$, the periclase-chrome ore — chromic oxide powder mixture preferably having a lime to silica ratio of no greater than 1:1 and especially 0.5:1 or less, and a total silica content of less than 3%, particularly less than 2%.

In accordance with the method of the present invention, the refractory batch essentially comprised of the chrome ore, periclase and chromic oxide as described above is thoroughly mixed to disperse the fines. A temporary or "green" binder and tempering liquid, typically lignosulfonate and water, are mixed into the batch until the mass is uniform and pressable. Pressing is carried out using the standard equipment and in accordance with the standard methods commonly employed in the refractories industry.

The shapes can be dried, but in any event are fired in a kiln to a minimum temperature of 1700° C (3100° F) for at least about 2 hours and cooled at a rate usually not exceeding 100° C/hr. to avoid microcracks. A firing temperature of at least 1700° C is an important process requirement for the achievement of the desired microstructure. A particularly superior product is attained when the refractory shape is fired to a temperature of about 1760° C. It is advantageous to fire to about 1760° C for at least 4 hours.

Compared to a conventional direct bonded brick composition without the chromic oxide addition, the brick of this invention has increased density, ultra-high temperature (1600° C) bending strength and improved compressive load bearing resistance at 1700° C while the porosity is low. Physical properties of direct bonded compositions with and without the chromic oxide additions are shown in the examples below.

An important feature of the improved direct bonded brick of this invention is that even though the compositions containing the chromic oxide are of increased density and reduced porosity after firing at high temperatures, the refractory retains its spall or thermal shock resistance.

The feature believed responsible for the superior slag resistance and actual improved performance in service, is the formation of widely distributed chromium rich spinel crystals in the periclase microstructure which inhibit slag or foreign silicate penetration. Slag and foreign silicates penetrate deeper into the microstructure of conventional direct bonded brick not having this additional, improved bonding feature. As a result, individual periclase crystals in conventional direct bonded brick are floated out or eroded away in a high liquids zone. Deep slag penetration is also detrimental to service life because the altered zone has different thermal-mechanical properties. The boundary between altered and original structure is the location of stress concentration and subsequent fracture, crack propagation, and eventual slabbing, a common wear mechanism of refractories.

Many facets of this invention are further illustrated by the following examples which are not to be construed as limitations thereof. Various other compositions, embodiments, modifications, and equivalents of these examples will readily suggest themselves to those skilled in the art without departing from the spirit of the present invention or the scope of the appended claims. All percentages and parts referred to herein are by weight unless otherwise indicated. All particle sizes or sieve classifications are Tyler series.

EXAMPLE 1

A series of experimental high fired direct bonded magnesite-chrome compositions of approximately 60% MgO were prepared in the laboratory. The prepared batches were pressed at 15,000 psi into 6 × 1 × 1 inch bars in a hydraulic press. After drying, the test shapes were fired to 3200° F (1760° C) in a high firing kiln and held at that temperature for at least 4 hours before the cooling cycle was started.

The analysis of the starting raw materials is as follows:

| High Purity Periclase | |
|---|---|
| MgO | 97.6% |
| SiO$_2$ | 0.7% |
| Fe$_2$O$_3$ | 0.2% |
| Al$_2$O$_3$ | 0.3% |
| CaO | 1.0% |
| B$_2$O$_3$ | 0.2% |

| Chrome Ore | −10 Mesh | −65 Mesh |
|---|---|---|
| SiO$_2$ | 2.8% | 2.2% |
| Cr$_2$O$_3$ | 35.5% | 36.1% |
| FeO | 15.2% | 15.9% |
| Al$_2$O$_3$ | 29.8% | 30.2% |
| CaO | 0.3% | 0.2% |

| | -continued | |
|---|---|---|
| MgO | 16.4% | 15.4% |

The analysis of the mix compositions (% by weight) is shown in Table I.

TABLE I

| | Sieve Classification (Mix) | A | B | N | D | E |
|---|---|---|---|---|---|---|
| Periclase | −8 + 28 mesh | 26 | 26 | 26 | 26 | 26 |
| | Ball Mill Fines (60% minimum −325 mesh) | 22 | 22 | 22 | 22 | 22 |
| Chrome Ore | −10 mesh | 32 | 32 | 32 | 32 | 32 |
| | −65 mesh | 9 | 9 | 9 | 9 | 9 |
| High Fired Brick Rejects, 60% MgO | −8 + 28 mesh | 5.5 | 5.5 | 5.5 | 5.5 | 5.5 |
| | −48 mesh | 5.5 | 5.5 | 5.5 | 5.5 | 5.5 |
| Chromic Oxide, ADDED | −325 mesh | 0 | 0.5 | 1.5 | 5.0 | 10.0 |
| Lignosulfonate Binder, ADDED | | 2.0 | 2.0 | 2.0 | 2.0 | 2.0 |
| Bulk Density After Drying at 300° F | g/cc | 3.01 | 3.06 | 3.05 | 3.15 | 3.25 |

Based on the chemical analysis of the raw materials the chemical composition of the control Mix A was as follows:

| SiO$_2$ | 1.7% |
|---|---|
| Fe$_2$O$_3$ | 7.2% |
| Al$_2$O$_3$ | 13.8% |
| CaO | 0.7% |
| MgO | 60.3% |
| Cr$_2$O$_3$ | 16.3% |

Mixes B, N, D, and E increased in Cr$_2$O$_3$ content commensurate with the additions of chromic oxide powder listed in Table I.

Each sample was measured before and after firing to determine dimensional changes due to reactions between the raw materials. Properties were evaluated by testing for open or apparent porosity, bulk density, hot modulus of rupture at 2700° F and hot crushing resistance at 2800° F. Physical properties are shown in Table II:

TABLE II

| | Mix A | Mix B | Mix N | Mix D | Mix E |
|---|---|---|---|---|---|
| Linear Firing Change -% | +0.07 | −0.02 | −0.07 | −0.05 | +0.03 |
| Fired Bulk Density g/cc | 2.96 | 3.01 | 3.01 | 3.10 | 3.13 |
| Apparent Porosity -% | 17.8 | 17.8 | 16.7 | 16.3 | 15.1 |
| Hot Modulus of Rupture at 2700° F -psi | 505 | 395 | 415 | 520 | 640 |
| Hot Crushing Strength at 2800° F -psi | 780 | 745 | 875 | 930 | 1280 |

It can be observed that as the chromic oxide powder addition is increased, the bulk density and crushing resistance are increased while the porosity is reduced.

EXAMPLE 2

Additional experimental 60% MgO class direct bonded compositions were processed in the laboratory using larger batches than were used in Example 1. 9 × 4½ × 2½ inch rectangular brick were pressed under forming pressures of 12,000 psi, dried at 220° F, and fired in a commercial high firing tunnel kiln to a peak temperature of about 3200° F (1760° C) for a minimum of 6 hours.

The chemical composition of the periclase used in these experiments is as follows:

| High Purity Periclase | |
|---|---|
| MgO | 97.8% |
| $SiO_2$ | 0.6% |
| $Fe_2O_3$ | 0.3% |
| $Al_2O_3$ | 0.3% |
| CaO | 0.8% |
| $B_2O_3$ | 0.2% |

The chrome ore used was the same material shown in Example 1 as −10 mesh.

The analysis of the mix compositions is shown in Table III.

TABLE III

| | Sieve Classi-fication (Mix) | F | G | H | I |
|---|---|---|---|---|---|
| Periclase | −4 + 8 mesh | 19.5 | 19.5 | 19.5 | 19.5 |
| | −8 + 28 mesh | 6.5 | 6.5 | 6.5 | 6.5 |
| | Ball Mill Fines (60% minimum −325 mesh) | 30.0 | 30.0 | 30.0 | 30.0 |
| Chrome Ore | −10 mesh + 28 mesh | 21.5 | 21.5 | 21.5 | 21.5 |
| | −28 mesh | 12.0 | 12.0 | 12.0 | 12.0 |
| | Ball Milled −150 mesh | 5.0 | 5.0 | 5.0 | 5.0 |
| High Fired Brick Rejects | −48 mesh | 5.5 | 5.5 | 5.5 | 5.5 |
| Chromic Oxide, ADDED | −325 mesh | 0.0 | 2.0 | 3.0 | 5.0 |
| Lignosulfonate ADDED | (solution) | 3.5 | 3.5 | 3.5 | 3.5 |
| Bulk Density, Dried at 220° F | g/cc | 3.10 | 3.15 | 3.17 | 3.24 |

The testing was the same as was used to evaluate the materials in Example 1, with the addition of higher temperature modulus of rupture tests and the addition of a compressive load test. Improvements in fired density, porosity, were noted as in Example 1. In addition, the extremely high temperature properties at 2900° F and 3100° F show marked improvement due to the additional bonding caused by the formation of magnesium chromite spinel in the matrix. Test results are shown in Table IV:

TABLE IV

| | Mix F | Mix G | Mix H | Mix I |
|---|---|---|---|---|
| Fired Bulk Density-g/cc | 3.03 | 3.11 | 3.15 | 3.18 |
| Apparent Porosity-% | 18.0 | 15.5 | 14.0 | 13.5 |
| Hot Modulus of Rupture-psi | | | | |
| at 2700° F | 615 | 510 | 630 | 750 |
| at 2800° F | 555 | 355 | 455 | 460 |
| at 2900° F | 145 | 155 | 210 | 210 |
| Hot Crushing Strength-psi | | | | |
| at 2800° F | 640 | 890 | 1080 | 780 |
| Compressive Load Resistance, 50 psi at 3100° F | | | | |
| Hrs. to failure | 0.1 | 0.75 | 0.75 | No failure after 2 hrs. |

EXAMPLE 3

Improvements in high temperature properties shown in Example 2 can also be achieved in high fired direct bonded brick where a low porosity is achieved by the use of high density periclase having a high lime to silica ratio. This periclase when combined with the lowest silica chrome ore yields a direct bonded composition with an overall lime/silica ratio of above 1.3:1 and can be as high as 2:1 or adjusted with various lime source additions. Such brick can be pressed to a high density, tend to expand less on firing, or in many cases actually shrinks. This product is available commercially and well known in the art.

Experimental batches were processed into brick shapes, fired and evaluated using the same procedures used in Example 2. The chemical composition of the starting raw materials is as follows:

| High Lime Periclase | |
|---|---|
| MgO | 96.2% |
| $SiO_2$ | 1.2% |
| $Fe_2O_3$ | 0.2% |
| $Al_2O_3$ | 0.2% |
| CaO | 2.2% |
| $B_2O_3$ | 0.02% |

| Low Silica Chrome Ore | |
|---|---|
| $SiO_2$ | 0.9% |
| $Fe_2O_3$ | 26.0% |
| $Al_2O_3$ | 15.9% |
| $Cr_2O_3$ | 46.5% |
| MgO | 10.5% |
| CaO | 0.2% |

Experimental compositions and test properties are given in Table V:

TABLE V

| | Sieve Classi-fication (Mix) | J | K |
|---|---|---|---|
| Periclase | −4 + 8 mesh | 5.5 | 5.5 |
| | −8 + 28 mesh | 37.0 | 37.0 |
| | Ball Mill Fines (60% −325 mesh) | 15.0 | 15.0 |
| Chrome Ore | −28 mesh | 42.5 | 42.5 |
| Chromic Oxide, ADDED | −325 mesh | — | 4.0 |
| Lignosulfonate ADDED | (solution) | 3.5 | 3.5 |
| Fired Bulk Density - g/cc | | 3.29 | 3.36 |
| Apparent Porosity -% (kerosene method) | | 140 | 13.6 |
| Hot Modulus of Rupture | | | |
| at 2700° F - psi | | 565 | 550 |
| at 2900° F - psi | | 260 | 325 |
| CaO/Silica ratio | | 1.4:1 | 1.4:1 |

From the test results, the addition of 4.0% chromic oxide to the high lime/silica ratio, low porosity direct bonded type refractory produces only moderate improvements in the highest temperature strengths. Further evaluation of this compositional field revealed that the chromium rich spinels do retain a role in bonding areas of the hot face in service, but are less effective in inhibiting slag penetration in these high lime/silica ratio compositions. An improvement in penetration resistance could not be detected compared to the same base mix without the chromic oxide addition. On this basis, compositions with low $CaO/SiO_2$ ratios are preferred.

Direct bonded compositions, Mixes J and K, were compared with a composition, Mix C, in which the chromic oxide addition was 4.0%, in a rotary slag test referred to in the industry as the Valley Dolomite Slag Test furnace. The base composition of Mix C was the same as that of Mix A shown in Table I. Siliceous electric furnace (EF) and Argon Oxygen Decarburization (AOD) vessel slags were selected for the comparison of Mix C to Mixes J and K because of their reactive nature with basic refractories and because they are thought to be involved in determining the wear rate of refractory linings in such vessels.

The slag compositions are as follows:

|  | Chemical Composition - Synthetic Slag (%) | |
|---|---|---|
|  | L-5 (AOD) | M-1 (EF) |
| CaO | 27 | 33 |
| $SiO_2$ | 54 | 33 |
| $Fe_2O_3$ | 5 | 20 |
| $Al_2O_3$ | 4 | 4 |
| MnO | 5 | 5 |
| MgO | 5 | 5 |

The original inner diameter (opening) of the refractory lined slag furnace is about 3 inches. Ten pounds of synthetic slag pelletized to about 1 inch diameter pellets were fed to the furnace at a rate of 4 lbs. during the first hour and 2 lbs./hr. during the following three hours. The refractory hot face was maintained at 3050°–3150° F. After cooling, the eroded test shapes were removed and cut to expose the interior structure from hot to cold face. The depth of slag penetration was estimated by the physical densification and discoloration and later confirmed by petrographic examination. Mix C having 4.0% chromic oxide was arbitrarily rated as unity or 1. Ratings greater than 1 indicate greater or deeper penetration. Results are given in Table VI below:

TABLE VI

|  | Relative Slag Penetration | | | |
|---|---|---|---|---|
| Slag | Mix J | Mix K | Mix C | Conventional[1] |
| L-5 | 1.49 | 1.63 | 1.00 | 1.18 |
| M-1 | 1.09 | 1.11 | 1.00 | 1.02 |

[1]60% MgO class direct bonded without chromic oxide - similar to Mix A.

For the composition tested in Table VI, Mixes J and K, although possessing desirable characteristics of low porosity and high density, resisted the penetration of the siliceous slags to a lesser extent than Mix C. Even more surprising is the poor relative results of Mix K employing chromic oxide compared to Mix J or Mix C. These unexpected results can be explained by the fact that the native silicates of Mix C, controlled by the lime/silica ratio, are more compatible and less reactive to the silicates of the slag whose phases are determined by the lime/silica ratio. Considering Mix C and slags L-5 and M-1, the lime/silica ratios are about 1:1 or less than 1:1. The chromium enriched spinels of Mix K are not as stable in the high lime environment of the basic brick composition and are therefore not as available to act as slag inhibitors as the chromite spinels in Mix C which has a lower lime/silica ratio. This again indicates the preferability of lower $CaO/SiO_2$ ratios.

The importance of the low porosity and chromium rich spinel bonding, in combination with the preferred low lime/silica ratio or low basicity of the native silicates, in resisting slag penetration is even more apparent from examination of the microstructures of the refractories involved in the following examples.

EXAMPLE 4

Equally important to increased slag resistance is the optimization of mechanical properties, particularly thermal spall resistance. Direct bonded compositions were prepared similar to Mix A in Example 1, one without chromic oxide and one modified by addition of 4% chromic oxide. After firing in a commericial tunnel kiln at temperatures above 1700° C (3100° F) for at least 4 hours, the brick was tested for spall resistance along with other commercially available classes of magnesite-chrome refractory brick.

The test used for evaluation of thermal shock resistance is called the prism spalling test. Prisms, 3 × 2 × 2 inches, are cut from each brick sample. The prisms are placed into an electrically preheated test furnace until they reach 1205° C (2200° F). After holding at that temperature for 20 minutes, the samples are removed and cooled in still air for 10 minutes. This procedure is repeated for up to 40 cycles or discontinued for those samples fractured by extensive crack propagation. Specimens able to withstand a higher number of cycles are more thermal shock resistant.

The following classes of refractory bricks were compared:

| Class Basic Refractory | Chemical Composition (%) | | | | | | Cycles |
|---|---|---|---|---|---|---|---|
|  | $SiO_2$ | $Fe_2O_3$ | $Al_2O_3$ | $Cr_2O_3$ | CaO | MgO |  |
| Conventional Direct Bonded | 2.0 | 7.0 | 13.7 | 15.9 | 0.9 | 60.5 | 35–40 |
| Direct Bonded with 4% Chromic Oxide Added | 1.6 | 6.8 | 13.1 | 19.0 | 0.9 | 58.6 | 38+ |
| Rebonded, High Fired, Fused Grain | 1.5 | 11.2 | 6.9 | 17.8 | 0.7 | 62.0 | 23 |
| High Fired Direct Bonded Based on Pre-reacted Magnesia-Chrome Sinter | 2.9 | 9.5 | 6.6 | 22.7 | 1.2 | 57.1 | 15 |
| Fused and Cast Block | 2.5 | 10.5 (FeO) | 8.0 | 20.0 | 0.5 | 56.5 | 2 |

Prism spalling results indicate that while the brick of this invention, high fired direct bonded with chromic oxide added, has low porosity and good slag resistance, the thermal spalling resistance is as good as or better than conventional direct bonded brick. The high fired brick with chromic oxide has better shock resistance than rebonded fused grain, prereacted grain base, or fused cast 60% MgO basic refractory products.

EXAMPLE 5

Conventional direct bonded brick, Mix A of Example 1, was modified by addition of 4% chromic oxide to form Mix C and after firing was subjected to slagging tests and petrographic examination.

The dynamic rotary slag test was again used. Slagging was carried out at 3050°–3100° F with 10 lbs. of synthetic slag applied over a period of four hours. The slag composition was as follows:

|  | Slag Composition (%) |
| --- | --- |
| CaO | 37.5 |
| SiO$_2$ | 37.5 |
| FeO | 18.0 |
| Al$_2$O$_3$ | 2.0 |
| MnO | 3.0 |
| P$_2$O$_5$ | 1.0 |
| CaF$_2$ | 1.0 |

Erosion and pentration factors were chosen as 1.0 for the composition including chromic oxide. Values over unity indicate more erosion loss and penetration. Products were those tested in Example 4. The test results were as follows:

| Product Class, High Fired | Slag Erosion | Slag Penetration |
| --- | --- | --- |
| Conventional (Mix A) | 1.3 | 1.1 |
| Mix A plus 4% Chromic Oxide (Mix C) | 1.0 | 1.0 |
| Rebonded Fused Grain Brick | .6 | 1.0 |
| Pre-Reacted Grain Brick | .9 | 1.0 |
| Fused Cast | .5 | .7 |

Reference will now be made to the drawings which are for illustrative purposes only.

DETAILED DESCRIPTION OF THE DRAWINGS

Figure 1:
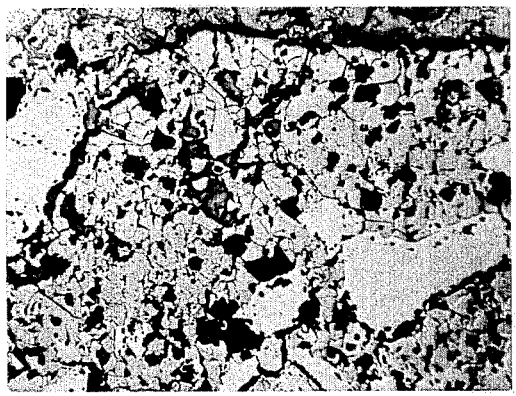
FIG. 1 is a photomicrograph at magnification of 35X showing the microstructure of slagged brick formed from Mix C in accordance with the present invention.
Figure 2:
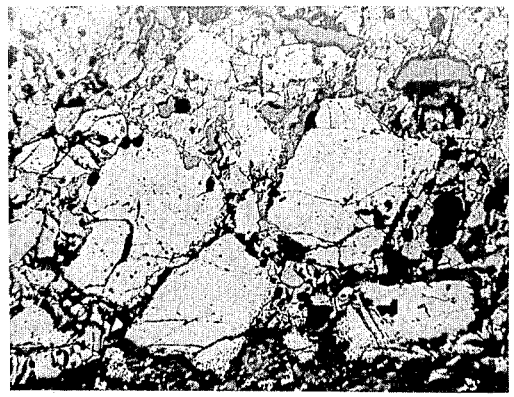
FIG. 2 is a photomicrograph at magnification of 35X showing the microstructure of slagged brick formed from conventional Mix A.

FIGS. 1–5 show the microstructural differences between slagged direct bonded brick made in accordance with the present invention and slagged conventional direct bonded brick not made in accordance with the present invention. FIG. 1 shows the microstructure at low magnification of brick formed from Mix C in accordance with the present invention and slagged as described in Examples 4 and 5. FIG. 2 shows the microstructure at the same magnification of brick formed from conventional Mix A and slagged in the same manner. Slag appears at the top of both photomicrographs.

The mechanism of slag penetration in both the brick of the present invention and the conventional brick includes penetration through boundaries between individual periclase and chromite crystals. An outstanding feature of this invention, visible in the microstructure of Mix C, even at the low magnification of FIGS. 1 and 2, is the superior amount of periclase-chromite bonding of the Mix C brick as compared to the Mix A standard direct bonded brick.

Figure 3:
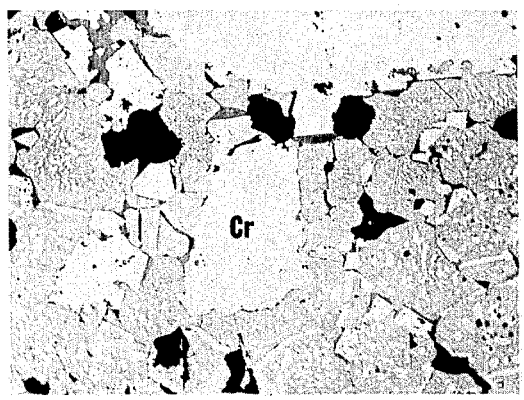
FIG. 3 is a photomicrograph at magnification of 130X showing the microstructure of slagged brick formed from Mix C in accordance with the present invention behind the hot face region of the brick.

The amount of slag liquid as a function of depth behind the hot face was found to more rapidly decrease for the Mix C brick than for the conventional Mix A brick. The Mix C brick also exhibits more secondary spinel at smaller depth behind the hot face. As shown in FIG. 3, "anchors", or recrystallized protrusions of spinel extend from chromite crystals (marked "Cr") into the brick matrix in the brick of Mix C. These anchors of spinel are believed to significantly contribute to the strength of the brick.

Figure 4:
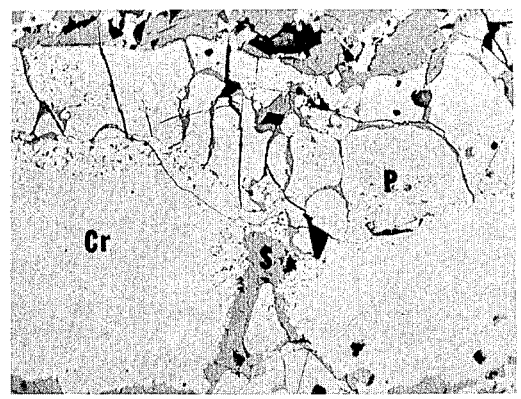
FIG. 4 is a photomicrograph at magnification of 130X showing the microstructure of slagged brick formed from Mix C in accordance with the present invention in the hot face region of the brick.
Figure 5:
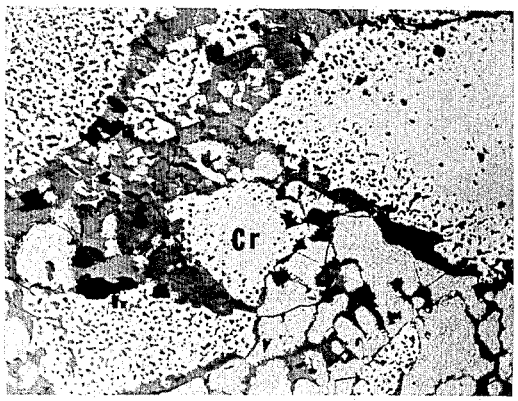
FIG. 5 is a photomicrograph at magnification of 130X showing the microstructure of slagged brick formed from conventional Mix A in the hot face region of the brick.

The microstructural details of the hot face regions of the Mix C and Mix A brick are shown in FIGS. 4 and 5 respectively. As noted above, the amount of periclase (P)-chromite (Cr) bonding is one of the outstanding features of the brick of this invention. The microstructure of the hot face region of the conventional direct bonded brick made from Mix A, shown in FIG. 5, exhibits a greater amount of intragranular slag penetration than that of the Mix C brick. The sponge-like appearance of the chromite particles after slag attack appears to be characteristic of attack by a slag of the chemical composition used in Example 5.

The photomicrographs of the drawings show that a brick made in accordance with the present invention retains spinel bonding closer to the hot face region than conventional direct bonded brick. That accounts for the superior slag erosion and penetration resistance, as well as the improved high temperature properties of brick made by this invention as compared to conventional direct bonded brick. Moreover, brick made in accordance with the present invention is more useful than other slag resistant products available, such as rebonded fused grain brick, prereacted grain brick, and fused cast brick of Examples 4 and 5 due to its superior thermal shock resistance.

Figure 6:
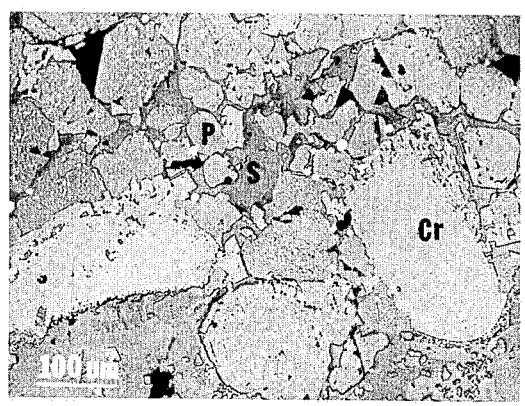
FIG. 6 is a photomicrograph at magnification of 130X showing the microstructure of a conventional 50% MgO direct bonded brick after in-use service.
Figure 7:
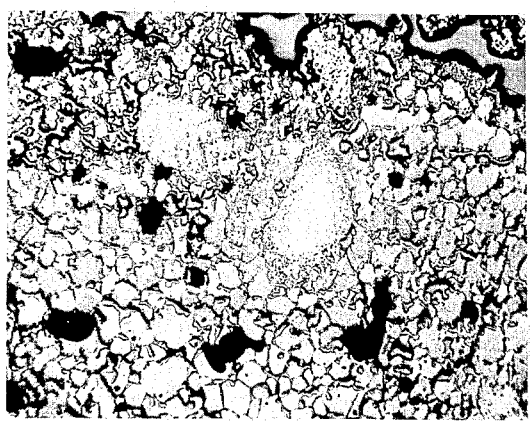
FIG. 7 is a photomicrograph at magnification of 130X showing the microstructure of brick formed from Mix C in accordance with the present invention in the hot face region of the brick after in-use service.
Figure 8:
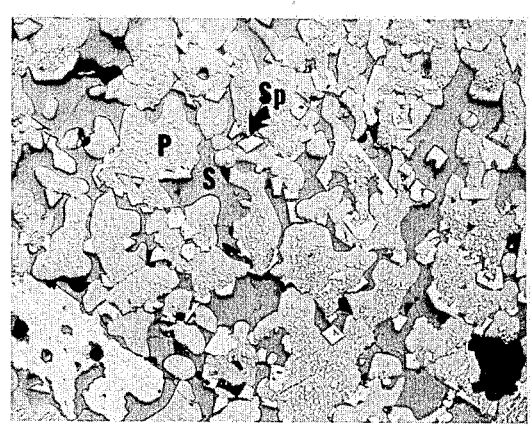
FIG. 8 is a photomicrograph at magnification of 140X showing the microstructure of brick formed from Mix C in accordance with the present invention at 1–2 mm behind the hot face after in-use service.

FIGS. 6–8 show the microstructural details of brick after service in a 100 ton AOD vessel. FIG. 6 shows the microstructure of a 50% MgO direct bonded brick at the region of the hot face from above the metal line. In this conventional used brick, silicates (S) have disrupted much of the bonding between rounded periclase crystals (P). Silicate phases at the hot face are merwinite and monticellite which are also present in the reduction cycle slag composition.

Samples of improved direct bonded brick made in accordance with the present invention in the 60% MgO class were examined after achieving excellent results in AOD test panels compared with other direct bonded products. FIG. 7 shows the microstructural details of the improved direct bonded brick of this invention at the region of the hot face. Intercrystalline silicate penetration is exhibited only at the immediate hot face.

The photomicrograph of FIG. 8 taken at 1-2 mm behind the hot face shows the presence of spinel structures (Sp) which apparently play a major role in the retention of brick integrity near the working surface. This bond retention accounts for the improved service life achieved by the direct bonded brick of the present invention.

The structural integrity resulting from the bonding by thermally stable spinels close to the hot face, in combination with the good thermal shock resistance, accounts for the superior performance of this improved direct bonded brick in oxygen blown open hearth roofs and back walls as well as AOD vessels and electric furnace side walls.

The invention in its broader aspects is not limited to the specific details shown in the examples and drawings and described in the specification. Departures may be made from such details without departing from the scope or spirit of the invention set forth in the appended claims.

What is claimed is:

1. A high fired direct bonded basic magnesite-chrome refractory shape characterized by the presence of chromium enriched spinel structures distributed in the matrix which bond the individual periclase crystals made by the steps of:
   a. forming a mixture of (1) from about 40% to about 75% by weight periclase containing at least about 94% MgO, (2) from about 25% to about 60% by weight chrome ore and (3) from about 0.5% to about 10% by weight chromic oxide powder;
   b. pressing the mixture into a refractory shape; and
   c. firing the refractory shape to a temperature of at least 1700° C.

2. A high fired refractory shape according to claim 1 in which the mixture has a lime to silica ratio of no greater than 1:1 and a total silica content of less than about 3%.

3. A high fired refractory shape according to claim 1 in which the refractory shape is fired to a temperature of about 1760° C.

4. A high fired direct bonded basic magnesite-chrome refractory shape characterized by the presence of chromium enriched spinel structures distributed in the matrix which bond the individual periclase crystals made by the steps of:
   a. forming a mixture of (1) from about 55% to about 65% by weight periclase containing at least about 94% by weight MgO, (2) from about 35% to about 45% by weight chrome ore and (3) from about 2% to about 7% chromic oxide powder, the mixture having a lime to silica ratio no greater than 1:1 and a total silica content of less than about 3%;
   b. pressing the mixture into a refractory shape; and
   c. firing the refractory shape to a temperature of at least 1700° C.

5. A high fired refractory shape according to claim 4 in which the chromic oxide powder consists essentially of −325 mesh particles.

6. A high fired refractory shape according to claim 5 in which the particles of chromic oxide powder have an average particle size of not greater than about 10 microns in diameter.

7. A high fired refractory shape according to claim 4 in which the mixture formed in step (a) comprises about 4% by weight chromic oxide powder.

8. A high fired refractory shape according to claim 4 in which the refractory shape is fired to a temperature of about 1760° C for at least about 4 hours.

9. A high fired refractory shape according to claim 4 in which the MgO content of the periclase is from about 96% to about 99% by weight.

10. A high fired refractory shape according to claim 4 in which the mixture has a lime to silica ratio of no greater than about 0.5:1 and a total silica content of less than about 2%.

11. A high fired direct bonded basic magnesite-chrome refractory brick characterized by the presence of chromium enriched spinel structures distributed in the matrix which bond the individual periclase crystals made by the steps of:
   a. forming a mixture of (1) from about 55% to about 65% by weight periclase having an MgO content of from about 96% to about 99% by weight, (2) from about 35% to about 45% by weight chrome ore and (3) from about 2% to about 7% chromic oxide powder consisting essentially of −325 mesh particles, the mixture having a lime to silica ratio of no greater then 1:1 and a total silica content of less than about 3%;
   b. pressing the mixture into shape of a refractory brick; and
   c. firing the refractory brick to a temperature of about 1760° C for at least about 4 hours.

12. A method of making an improved direct bonded basic refractory shape comprising the steps of:
   a. forming a mixture of (1) from about 40% to about 75% by weight periclase containing at least about 94% by weight MgO, (2) from about 25% to about 60% by weight chrome ore and (3) from about 0.5% to about 10% by weight chromic oxide powder;
   b. pressing the mixture into a refractory shape; and
   c. firing the refractory shape to a temperature of at least 1700° C.

13. A method according to claim 12 in which the mixture has a lime to silica ratio of no greater than 1:1 and a total silica content of less than about 3%.

14. A method according to claim 12 in which the refractory shape is fired to a temperature of about 1760° C.

15. A method of making an improved direct bonded basic refractory shape comprising the steps of:
   a. forming a mixture of (1) from about 55% to about 65% by weight periclase containing at least about 94% by weight MgO, (2) from about 35% to about 45% by weight chrome ore and (3) from about 2% to about 7% chromic oxide powder, the mixture having a lime to silica ratio no greater than 1:1 and a total silica content of less than about 3%;
   b. pressing the mixture into a refractory shape; and
   firing the refractory shape to a temperature of at least 1700° C.

16. A method according to claim 15 in which the chromic oxide powder consists essentially of −325 mesh particles.

17. A method according to claim 16 in which the particles of chromic oxide powder have an average particle size of no greater than about 10 microns in diameter.

18. A method according to claim 15 in which the mixture formed in step (a) comprises about 4% by weight chromic oxide powder.

19. A method according to claim 15 in which the refractory shape is fired to a temperature of about 1760° C for at least about 4 hours.

20. A method according to claim 15 in which the MgO content of the periclase is from about 96% to about 99% by weight.

21. A method according to claim 15 in which the mixture has a lime to silica ratio of no greater than about 0.5:1 and a total silica content of less than 2%.

22. A method of making an improved direct bonded basic refractory brick comprising the steps of:
   a. forming a mixture of (1) from about 55% to about 65% by weight periclase having an MgO content of from about 96% to about 99% by weight, (2) from about 35% to about 45% by weight chrome ore and (3) from about 2% to about 7% chromic oxide powder consisting essentially of −325 mesh particles, the mixture having a lime to silica ratio of no greater than 1:1 and a total silica content of less than about 3%;
   b. pressing the mixture into the shape of a refractory brick; and
   c. firing the refractory brick to a temperature of about 1760° C for at least about 4 hours.

* * * * *

UNITED STATES PATENT AND TRADEMARK OFFICE
CERTIFICATE OF CORRECTION

PATENT NO. : 4,039,343

DATED : August 2, 1977

INVENTOR(S) : Joseph L. Stein, Walter S. Treffner

It is certified that error appears in the above-identified patent and that said Letters Patent are hereby corrected as shown below:

In claim 6, line 3, "not" should be --no--.

In claim 11, subparagraph b, line 1, "the" should be between "into" and "shape".

In claim 15, subparagraph b, "firing the refractory shape to a . . ." should have been subparagraph c.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks